Feb. 18, 1947.   J. A. MOORE   2,416,112
FOUNTAIN PEN
Filed Aug. 28, 1945   2 Sheets-Sheet 1
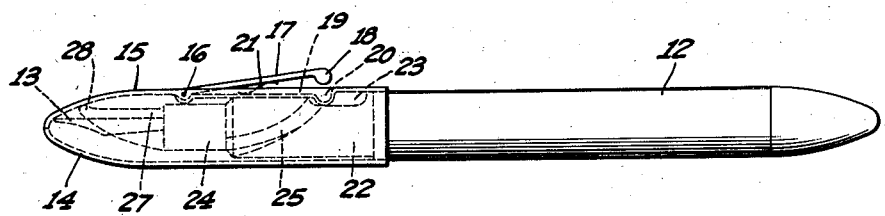
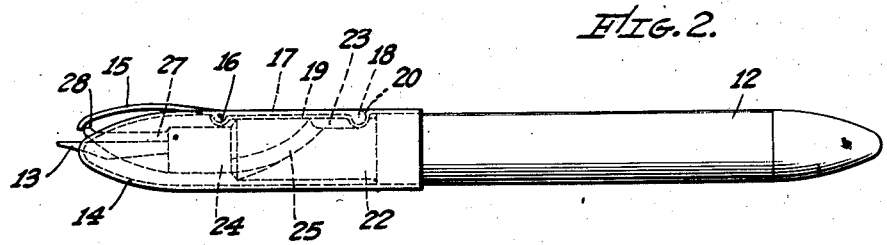
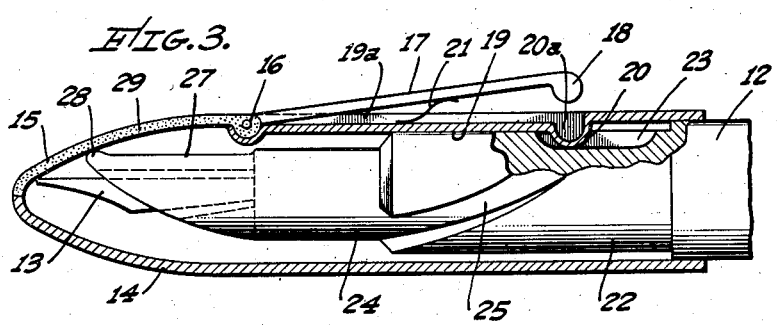
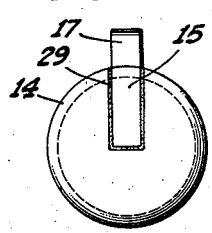
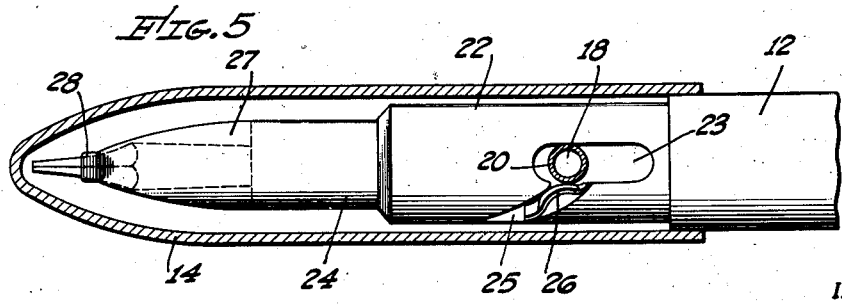
INVENTOR.
JAMES A. MOORE,
BY
ATTORNEY.

Feb. 18, 1947.　　　　J. A. MOORE　　　　2,416,112
FOUNTAIN PEN
Filed Aug. 28, 1945　　　2 Sheets-Sheet 2

INVENTOR.
JAMES A. MOORE,
BY
ATTORNEY.

Patented Feb. 18, 1947

2,416,112

UNITED STATES PATENT OFFICE 2,416,112

FOUNTAIN PEN

James A. Moore, Oceanside, Calif.

Application August 28, 1945, Serial No. 613,053

20 Claims. (Cl. 120—42)

My invention relates generally to fountain pens and more particularly to the class of fountain pens having a quick opening closure or housing for the pen nib.

It is often desirable, as when holding papers in one hand, to be able to open a fountain pen with a simple pushing motion of the fingers of the other hand, instead of having to use both hands to unscrew a cap from the body of the pen. When the pen is to be closed, it is important that the closure be tight, to prevent leakage of ink. It is also desirable, both for economy in manufacture and for convenience, lightness, and durability, to construct the carrying and covering portions of the pen holder with as few parts as possible, combining the functions of necessary parts and also some of their structural weight and strength whenever opportunity is presented.

It is therefore a principal object of my invention to provide a pen having a quick-acting closure easily operable with one hand.

It is a further object to provide a closure which will be automatically tightened and sealed by the simple act of clipping the pen to the user's clothes.

Another object of my invention is to provide a pen having few small frangible parts or parts subjected to bending stresses and tensions, and to utilize the strength of the major parts of my pen to effect opening and closing and holding in those positions.

Still another object is to combine the functions of the remaining major parts of my pen in such a manner that a few operating parts may be sturdily constructed, and materials and manufacturing cost be saved on the others.

In attaining these objectives, as will presently be made clear from the detailed description which follows and from the drawings, I have considered the principal, or most fundamental, parts of a fountain pen to be the nib, a barrel supporting the nib and serving as handle and ink reservoir, a closure protecting the nib when it is not in use, and a clip for conveniently carrying the pen. In my pen, the nib may be conventional, though not necessarily so. The barrel is also conventional in its functions of pen-holder, handle, and ink reservoir and is changed in detail to enable it to support slidably a cap sleeve and to bring pressure against a movable segment of the cap sleeve. The cap sleeve is tapered to a blunt point at the nib end and the movable segment extends forwardly to the point and is hinged rearwardly thereof. Forward pressure of the barrel within the sleeve moves the segment outwardly and permits the nib to emerge from the closure. In my preferred embodiment, the segment is held closed, when the pen is not in use, by a spring acting against a rearward extension of the segment beyond the hinge. In a modified embodiment, a different type of spring urges the barrel rearwardly within the cap sleeve and holds the segment closed with a trigger action which is released when the barrel is pushed forward. In all my embodiments, the rearward extension of the segment, pushed outwardly from the cap sleeve when the segment is closed, serves as the clip, and the action of jamming the clip on the edge of a pocket serves to tighten the closure. As the tapered cap sleeve is comparable to the ordinary threaded cap and the hinged segment is integral with the clip, I have provided a pen openable and closable with one hand by modification of three of the four fundamentals and the addition of a spring.

Further advantages will appear from consideration of the following detailed description, and of the drawings, in which:

Figure 1 is a side elevation of the preferred embodiment of my invention, in closed position with some of the concealed parts shown by dotted lines;

Figure 2 is a view similar to Fig. 1, but with the pen in open position ready for use;

Figure 3 is an enlarged view of the forward, or left-hand portion of Fig. 1, with the outer parts shown in section and the interior parts partly in elevation and partly in section;

Figure 4 is an end elevation taken from the left of Fig. 3, the form of the sleeve being more clearly illustrated by indicating its interior surface in dotted lines;

Figure 5 is a view similar to Fig. 3, taken at right angles thereto and partly in section and partly in plan;

Figures 6, 7:
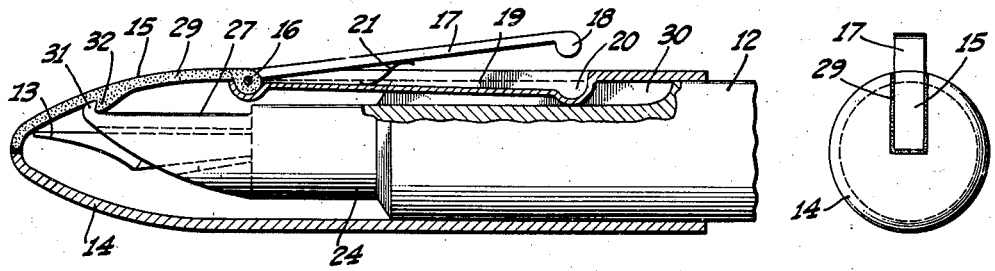
Figure 6 is an enlarged view similar to Fig. 3 of a modified form of my invention, the outer parts being shown in section and the inner parts partly in elevation and partly in section.
Figure 7 is an end elevation similar to Fig. 4 of the modified form shown in Fig. 6.

Turning now to Figs. 1 to 5, illustrative of my preferred form, 12 indicates the barrel of my pen, forming the conventional ink reservoir, and carrying a nib 13 mounted in the usual manner so as to have its point eccentric from and, when in normal writing position, above the longitudinal axis of the pen. A cap sleeve 14, tapered at its forward end to form a bluntly pointed cap, is carried slidably on the forward end of the barrel 12 and extends rearwardly to cover that portion of the barrel ordinarily grasped by a writer's fingers. The cap sleeve 14 has a slot extending longitudinally from the tapered forward end to a point slightly rearwardly of the beginning of the taper, and this slot is fitted with a closure or segment 15 carried by a hinge pin 16 mounted on the cap-sleeve at the rearward end of the slot. The closure 15 fits flush with the pointed end of the cap sleeve 14 and gives the appearance of being simply a longitudinal segment cut therefrom and replaced on a concealed hinge.

A prolongation of the closure 15 extends rearwardly of the hinge pin 16 to form a clip 17, terminating in the usual clip button 18, the closure and the clip being integral in one member and making a slight angle with each other at the hinge pin 16 so that when one lies flush with the cap sleeve, the other will extend outwardly therefrom. That portion of the cap sleeve lying directly under the clip 17 has on its inner side a longitudinal ridge 19 terminating in a hump or protuberance 20 formed by an inward curvature of the cap sleeve and thereby forming on the outer side of the cap sleeve a groove 19a and a recess 20a to receive respectively the clip 17 and the button 18 in smooth alignment with the cap sleeve when the closure 15 is open and the pen is ready for writing. A leaf spring 21, mounted in the groove 19a urges the clip 17 outwardly.

The barrel 12 fits slidably within the cap sleeve 14 for a sufficient distance to create a bearing surface and then has a portion 22 of reduced diameter bearing against the ridge 19. An elongated recess 23 is provided to receive the protuberance 20, the forward and rearward ends of the recess 23 cooperating with the protuberance 20 as stops limiting the movement of the cap sleeve 14 upon the barrel 12. The barrel extends forwardly of the reduced portion 22 in a portion 24 of further reduced diameter to accommodate the inward curvature of the journals for the hinge pin 16. To permit assembly of the cap sleeve upon the barrel a helical groove 25 is provided in the portion 22 communicating with the recess 23. When the cap sleeve is placed upon the barrel, the protuberance 20 slides over the reduced portion 24, passes along the helical groove 25 and enters the recess 23, a leaf spring 26, shown in Fig. 5, permitting it to enter but blocking its egress except under pressure. It will be seen from Fig. 5 that the recess 23, acting as a guide for the protuberance 20, prevents rotation of the cap sleeve upon the barrel of the pen and keeps the closure 15 in alignment with the nib 13.

The forward end of the barrel 12 projects beyond the mounting of the nib 13 to form a nib-guard 27 with an up-turned nose 28 which does not quite make contact with the closure 15 when the cap sleeve 14 is pushed forward and the closure is closed, but does not make contact with it and pushes it outwardly when the cap sleeve is retracted, protecting the point of the nib at all times from contact with the closure. The side edges of the closure 15 are preferably covered with a thin resilient gasketing material, as indicated by dotted surfacing at 29 in Fig. 3, and the closed position of the closure is limited by contact of this gasket with the sides of the slot in which the closure rests, rather than by contact of the closure with the nose 28.

To place the pen in operating position, the writer may grasp the cap sleeve between the middle finger and thumb and push with the index finger against the rearward end of the barrel. The nose 28 will be pushed against the closure 15, causing it to open against the resistance of the spring 21 and allowing the nib to emerge. The clip 17 falls into the groove 19a in flush alignment with the cap sleeve, and the clip button 18 falls into the recess 20a. The protuberance 20, in turn, by contact with the end of the recess 23, limits the exposure of the nib to the amount required for writing. The nose 28 continues in contact with the tip of the closure 15, and thereby keeps the spring 21 under tension. As this tension acts transversely to the axis of the pen, it does not urge the cap sleeve forward again, but rather, by pressing on the extreme forward member of the barrel, it urges misalignment of the barrel and the cap sleeve, creating added friction between them to hold the cap sleeve in place. When the pen is to be closed, the barrel may be grasped between the fingers and palm, and the cap sleeve urged forward with the thumb and index finger. When the pen is clipped to the writer's pocket, the pressure beneath the clip 17 adds to the pressure of the spring 21 to press the gasketed closure 15 into its slot with a leak-proof seal. It will be observed that the pen may be opened and used without looking at it, as the clip is aligned above the nib and indicates to the writer's fingers when the nib is held in position for writing.

Figure 8:
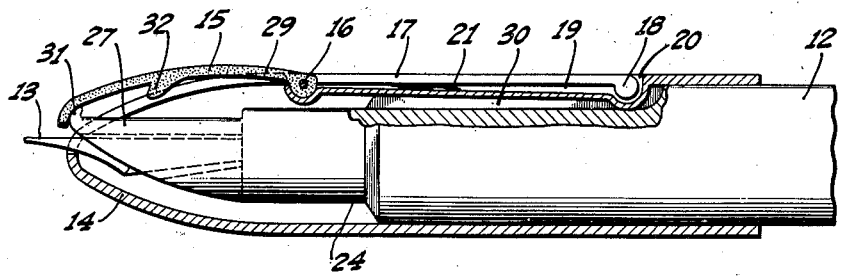
Figure 8 is a partly sectional, partly elevational view similar to Fig. 6, but with the pen in open position.

In Figs. 6, 7, and 8, I have illustrated a modified form of my pen in which no helical groove 25 is necessary. The first reduction in diameter of the barrel 12 is also eliminated and the barrel is in sliding contact with the cap sleeve 14 until the reduced portion 24 is reached. A long groove 30, having the depth of the protuberance 20 is substituted for the recess 23 and is continued forwardly to the reduced portion 24, so that the cap sleeve 14 may be assembled on the barrel without the half-twist used in assembling my preferred form. To prevent the cap sleeve from being detached from the barrel, the upturned nose of the nib guard 27 is provided with a catch 31, and the closure 15 is provided with a detent 32 which engages the catch 31 when the closure is closed. If it is desired to remove the cap sleeve, as for cleaning, the detent may be disengaged from the catch 31 by pressing down on the clip 17.

Figure 9:
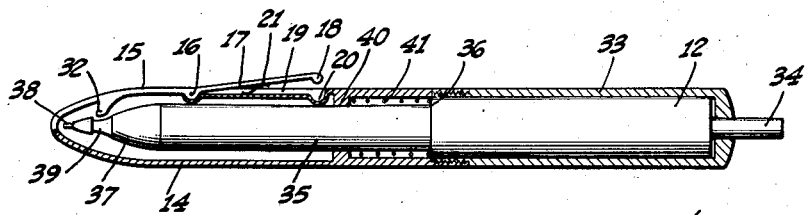
Figure 9 illustrates a further modification of my invention, on the same scale as Fig. 1 with outer parts shown in section and inner parts shown in elevation, with the pen in closed position.
Figure 10:
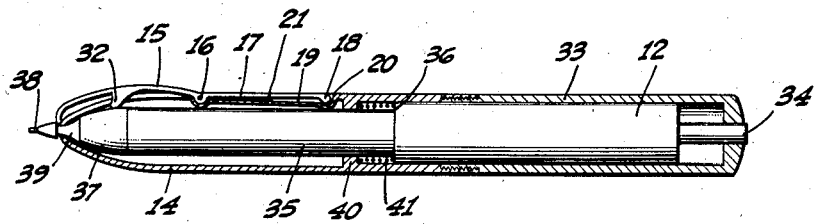
Figure 10 is a similar view of the modification shown in Fig. 9 but with the pen in open position.

A further modification, in the form of a stylus pen, is illustrated in Figs. 9 and 10. The cap sleeve 14 is joined, as by threads, to a sleeve extension 33 which encloses the rearward end of the barrel 12 except for a push-rod 34. The barrel 12 has a portion 35 of reduced diameter extending forwardly from a shoulder 36 near the joint of the cap sleeve 14 and the sleeve extension 33, and terminating in a conical point 37, bearing the stylus point 38. The conical point 37 is ringed by an annular groove 39 having a sharp rearward facing shoulder and a sloping forward facing shoulder, the rearward facing shoulder corresponding in function to the catch 31 of the previously described modification. The cap sleeve 14 has an interior annular ridge 40, between which and the shoulder 36 there is a spring 41 which urges the cap sleeve forwardly. Contact of the sleeve extension 33 against the rearward end of the barrel 12 will limit the forward movement of the combined sleeves in the event that the hereinafter described catch is disengaged. The forward end of the cap sleeve 14 is slotted, as in my preferred form and first modification, to receive the closure 15, but in this form the slot and the closure are extended beyond the axial point of the cap sleeve, the point 38 of a stylus pen being usually axial and not slightly eccentric as in the other forms. The closure 15 has a detent 32, as in my first modification, which engages the rearward facing shoulder of the groove 39 when the pen is closed and holds the barrel 12 from quite making contact with the rear closure of the sleeve extension 33, and at the same time holds the closure 15 closed and the clip 17 in its outward position, these members being urged to these respective positions by the spring 21. The detent 32 also serves, in this form, to contact the conical point 37 when the barrel is pushed forward and thereby to open the closure 15, the stylus form of pen not being provided with a nib guard as are the other forms. When the pen is opened, the downwardly extended end of the closure 15 catches against the sharp rearward facing shoulder of the groove 39 and holds the pen open. Because of the axial alignment of the stylus point 38, it is not necessary to key the cap sleeve 14 against rotary motion relative to the barrel 12, and the reduced portion 35 is not provided with a groove to receive the ridge 19 and the protuberance 20 of the cap sleeve but is sufficiently reduced in diameter so that the groove 19a and recess 20a may be a little deeper than is necessary to bring the clip 17 into flush alignment with the cap sleeve when the pen is open. This added depth permits the writer to press the clip inwardly and to disengage the point of the closure 15 from the groove 39 in order to close the pen.

In operation of my stylus form of pen, the writer pushes on the push rod 34 with index finger or thumb while grasping the pen between the other fingers and palm, and thereby thrusts the barrel 12 forward against compression of the spring 41. The detent 32, making contact with the conical point 37 causes the closure 15 to open and the end of the closure catches in the groove 39, holding the pen open. To close the pen the writer pushes inwardly on the clip 17, releasing the closure 15 from the groove 39. The spring 41 retracts the barrel 12 within the cap sleeve 14 and the detent 32 is urged by the spring 21 to engage the groove 39, thereby holding the clip 17 outwardly and ready to engage the pocket of the writer.

It will be seen that in all three forms above described, the cap sleeve 14 covers the portion of the pen ordinarily grasped by the fingers in writing. In the ordinary screw-cap pen, the threads engaging the cap to the barrel are so positioned as to allow ink leaking from the nib to cover the forward end of the barrel within the cap and thereafter to stain the fingers when the pen is opened. With my form of closure and sleeve, the part of the pen grasped by the writer is always clean.

It will also be observed that instead of creating a multiplicity of small parts, I have utilized what I have heretofore called the fundamental parts of a pen by giving them added functions, and that in modifying them to perform these functions, I have increased their strength. For example, the ridge 19, being outwardly in the form of a channel, adds structural durability to the cap sleeve 14. The annular ridge 40 gives additional strength to the cap sleeve 14 in my stylus form of pen. The shoulders on the barrel 14 between portions of different diameters give strength to that member. And the closure 15, by laying flush with the cap sleeve 14 instead of overlapping it, both receives and gives support and protection.

When in the claims I refer to a nib, I mean to include by that term any style of writing point or element.

Having now described particular forms in which the invention may be embodied in practice, I wish it understood that this is illustrative and that various changes in design, structure, and arrangement of parts may be made without departure from the spirit and scope of the invention which is defined by the appended claims.

I claim:

1. In a fountain pen of the class described, a barrel, a nib carried by said barrel, means slidable on said barrel for enclosing said nib and having a closed end and a longitudinal segmental opening extending rearwardly from said closed end, part of said opening being in alignment with and adapted to permit egress of said nib, a pivot mounted on said slidable means adjacent the rearward end of said opening, and a pivoted member carried by said pivot having a portion extending rearwardly of said pivot adapted to form a clothes clip and a portion extending forwardly of said pivot adapted to seal said opening when said rearwardly extending portion is urged away from said slidable means.

2. In a fountain pen of the class described, a barrel, a nib carried by said barrel, means slidable on said barrel for enclosing said nib and having a closed end and a longitudinal segmental opening extending rearwardly from said closed end, part of said opening being in alignment with and adapted to permit egress of said nib, a pivot mounted on said slidable means adjacent the rearward end of said opening, a pivoted member carried by said pivot having a portion extending rearwardly of said pivot adapted to form a clothes clip and a portion extending forwardly of said pivot adapted to seal said opening when said rearwardly extending portion is urged away from said slidable means, and means carried by said barrel independent of said nib for moving said forward portion of said pivoted member out of sealing position when said barrel is moved forwardly relative to said slidable means.

3. In a fountain pen of the class described, a barrel, a nib carried by said barrel, means slidable on said barrel for enclosing said nib and having a closed end and a longitudinal segmental opening extending rearwardly from said closed end, part of said opening being in alignment with and adapted to permit egress of said nib, a pivot mounted on said slidable means adjacent the rearward end of said opening, a pivoted member carried by said pivot adapted to form a clothes clip and a portion extending forwardly of said pivot adapted to seal said opening when said rearwardly extending portion is urged away from said slidable means, means resiliently urging said rearwardly extending portion away from said slidable means, and means carried by said barrel independent of said nib for moving said forward portion of said pivoted member out of sealing position when said barrel is moved forwardly relative to said slidable means.

4. In a fountain pen of the class described, a barrel, a nib carried by said barrel, means slidable on said barrel for enclosing said nib and having a closed end and a longitudinal segmental opening extending rearwardly from said closed end, part of said opening being in alignment with and adapted to permit egress of said nib, a pivot mounted on said slidable means adjacent the rearward end of said opening, a pivoted member carried by said pivot having a portion extending rearwardly of said pivot adapted to form a clothes clip and a portion extending forwardly of said pivot adapted to seal said opening when said rearwardly extending portion is urged away from said slidable means, and means carried by said barrel independent of said nib for moving said forward portion of said pivoted member out of sealing position when said barrel is moved forwardly relative to said slidable means, a portion of said slidable means rearward of said pivot being bent inwardly to form a longitudinal ridge and a protuberance on the inner side thereof and a corresponding groove and recess on the outer side, said groove and recess being adapted to receive said rearwardly extending portion of said pivoted member in substantially flush alignment with said slidable means.

5. In a fountain pen of the class described, a barrel, a nib carried by said barrel, a sleeve slidable on said barrel for enclosing said nib and having a closed end and a longitudinal segmental opening extending rearwardly from said closed end, part of said opening being in alignment with and adapted to permit egress of said nib, a pivot mounted on said sleeve adjacent the rearward end of said opening, a pivoted member carried by said pivot having a portion extending rearwardly of said pivot adapted to form a clothes clip and a portion extending forwardly of said pivot adapted to seal said opening when said rearwardly extending portion is urged away from said sleeve, means carried by said barrel independent of said nib for moving said forward portion of said pivoted member out of sealing position when said barrel is moved forwardly relative to said sleeve, a portion of said sleeve rearward of said pivot being bent inwardly to form a longitudinal ridge and a protuberance on the inner side thereof and a corresponding groove and recess on the outer side, said groove and recess being adapted to receive said rearwardly extending portion of said pivoted member in substantially flush alignment with said sleeve, said barrel having a portion lying within said sleeve provided with a longitudinal groove adapted to coact with said protuberance as a keyway therefor.

6. In a fountain pen of the class described, a barrel, a nib carried by said barrel, a sleeve on said barrel for enclosing said nib and having a closed end and a longitudinal segmental opening extending rearwardly from said closed end, part of said opening being in alignment with and adapted to permit egress of said nib, a pivot mounted on said sleeve adjacent the rearward end of said opening, a pivoted member carried by said pivot having a portion extending rearwardly of said pivot adapted to form a clothes clip and a portion extending forwardly of said pivot adapted to seal said opening when said rearwardly extending portion is urged away from said sleeve, means carried by said barrel independent of said nib for moving said forward portion of said pivoted member out of sealing position when said barrel is moved forwardly relative to said sleeve, catch means forming a part of said last-defined means, and a detent carried by said forward portion of said pivoted member adapted to engage said catch means when said forward portion is in sealing position, a portion of said sleeve rearward of said pivot being bent inwardly to form a longitudinal ridge and a protuberance on the inner side thereof and a corresponding groove and recess on the outer side, said groove and recess being adapted to receive said rearwardly extending portion of said pivoted member in substantially flush alignment with said sleeve.

7. A closure for a fountain pen of the class described comprising a sleeve slidable on the barrel of said pen and having an opening at least in part aligned with the nib of said pen and adapted to permit the egress thereof, a pivot carried by said sleeve, a member mounted on said pivot having a forwardly extending portion adapted to close said opening and to be pressed outwardly therefrom when the barrel of said pen is moved forwardly within said sleeve and having a portion extending outwardly from said pivot when said forwardly extending portion is in position to close said opening, and a spring bearing against said sleeve and against said outwardly extending portion whereby said forwardly extending portion is urged to close said opening.

8. A closure for a fountain pen of the class described comprising a sleeve slidable on the barrel of said pen and having an opening at least in part aligned with the nib of said pen and adapted to permit the egress thereof, a pivot carried by said sleeve, cover means for said opening carried pivotally by said pivot, and means separate from said nib and actuable by the forward movement of said barrel within said sleeve for urging said cover means away from said opening.

9. A closure for a fountain pen of the class described comprising a sleeve closed at one end and slidably mounted on said pen to enclose the nib thereof, a pivot carried by said sleeve, and a member pivoted on said pivot having a portion forward thereof adapted to form a longitudinal segment of said closed end of said sleeve when in one position and to provide an opening for the egress of said nib when in another position and a second portion rearward of said pivot diverging from said sleeve at an acute angle thereto when in the first-named position and adapted therein to form a clothes clip and lying in substantially flush alignment with said sleeve when in the second-named position.

10. A closure for a fountain pen of the class described comprising a sleeve closed at one end and slidably mounted on said pen to enclose the nib thereof, a pivot carried by said sleeve, a member pivoted on said pivot having a portion forward thereof adapted to form a longitudinal segment of said closed end of said sleeve when in one position and to provide an opening for the egress of said nib when in another position and a second portion rearward of said pivot diverging from said sleeve at an acute angle thereto when in the first-named position and adapted therein to form a clothes clip and lying in substantially flush alignment with said sleeve when in the second-named position, and means for receiving said second portion in flush alignment with said sleeve.

11. A closure for a fountain pen of the class described comprising a sleeve closed at one end and slidably mounted on said pen to enclose the nib thereof, a pivot carried by said sleeve, a member pivoted on said pivot having a portion forward thereof adapted to form a longitudinal segment of said closed end of said sleeve when in one position and to provide an opening for the egress of said nib when in another position and a second portion rearward of said pivot diverging from said sleeve at an acute angle thereto when in the first-named position and adapted therein to form a clothes clip and lying in substantially flush alignment with said sleeve when in the second-named position, and means for keying said sleeve to the body of said pen and forming in part a recess adapted to receive said second portion in flush alignment with said sleeve.

12. A closure for a fountain pen of the class described comprising a sleeve closed at one end and slidably mounted on said pen to enclose the nib thereof, a pivot carried by said sleeve, a member pivoted on said pivot having a portion forward thereof adapted to form a longitudinal segment of said closed end of said sleeve when in one position and to provide an opening for the egress of said nib when in another position and a second portion rearward of said pivot diverging from said sleeve at an acute angle thereto when in the first-named position and adapted therein to form a clothes clip and lying in substantially flush alignment with said sleeve when in the second-named position, and spring means urging said pivoted member into said second-named position.

13. The combination of a closure for a fountain pen and a clothes clip pivoted on a pivot common to both, whereby outward pressure on said clothes clip increases the sealing pressure of said closure.

14. In a fountain pen of the class described, a barrel, a nib carried by said barrel, a sleeve closed at one end and slidably carried by said barrel so as normally to enclose said nib and having a longitudinal segmental opening extending rearwardly from said closed end, part of said opening being in alignment with and adapted to permit egress of said nib, a pivot mounted on said sleeve adjacent the rearward end of said opening, a closure for said segmental opening pivotally supported by said pivot, a clothes clip carried by said closure extending rearwardly from said pivot, a portion of said sleeve rearward of said pivot being bent inwardly to form a longitudinal ridge and a protuberance on the inner side thereof and a conforming groove and recess on the outer side, said groove and said recess being adapted to receive said clip in flush alignment with said sleeve, a portion of said barrel within said sleeve having a longitudinal groove adapted to coact with said protuberance as a keyway therefor, a spring carried in said first-mentioned groove urging said clip outwardly from said sleeve, and a nib guard supported by said barrel and having an upturned end adapted to make contact with said closure and to move said closure outwardly from said segmental opening when said barrel is moved forwardly relative to said sleeve.

15. In a fountain pen of the class described, a barrel, a nib carried by said barrel, a sleeve closed at one end and slidably carried by said barrel so as normally to enclose said nib and having a longitudinal segmental opening extending rearwardly from said closed end, part of said opening being in alignment with and adapted to permit egress of said nib, a pivot mounted on said sleeve adjacent the rearward end of said opening, a closure for said segmental opening pivotally supported by said pivot, a clothes clip carried by said closure extending rearwardly from said pivot, a portion of said sleeve rearward of said pivot being bent inwardly to form a longitudinal ridge and a protuberance on the inner side thereof and a conforming groove and recess on the outer side, said groove and said recess being adapted to receive said clip in flush alignment with said sleeve, a portion of said barrel within said sleeve having a longitudinal groove adapted to coact with said protuberance as a keyway therefor, and a spring carried in said first-mentioned groove urging said clip outwardly from said sleeve.

16. In a fountain pen of the class described, a barrel, a nib carried by said barrel, a sleeve closed at one end and slidably carried by said barrel so as normally to enclose said nib and having a longitudinal segmental opening extending rearwardly from said closed end, part of said opening being in alignment with and adapted to permit egress of said nib, a pivot mounted on said sleeve adjacent the rearward end of said opening, a closure for said segmental opening pivotally supported by said pivot, and a clothes clip carried by said closure extending rearwardly from said pivot, a portion of said sleeve rearward of said pivot being bent inwardly to form a longitudinal ridge and a protuberance on the inner side thereof and a conforming groove and recess on the outer side, said groove and said recess being adapted to receive said clip in flush alignment with said sleeve, a portion of said barrel within said sleeve having a longitudinal groove adapted to coact with said protuberance as a keyway therefor.

17. In a fountain pen of the class described, a barrel, a nib carried by said barrel, a sleeve closed at one end and slidably carried by said barrel so as normally to enclose said nib and having a longitudinal segmental opening extending rearwardly from said closed end, part of said opening being in alignment with and adapted to permit egress of said nib, a pivot mounted on said sleeve adjacent the rearward end of said opening, a closure for said segmental opening pivotally supported by said pivot, and a clothes clip carried by said closure extending rearwardly from said pivot, a portion of said sleeve rearward of said pivot being bent inwardly to form a longitudinal ridge and a protuberance on the inner side thereof and a conforming groove and recess on the outer side, said groove and said recess being adapted to receive said clip in flush alignment with said sleeve.

18. In a fountain pen of the class described, a barrel, a nib carried by said barrel, a sleeve closed at one end and slidably carried by said barrel so as normally to enclose said nib and having a longitudinal segmental opening extending rearwardly from said closed end, part of said opening being in alignment with and adapted to permit egress of said nib, a pivot mounted on said sleeve adjacent the rearward end of said opening, a closure for said segmental opening pivotally supported by said pivot, and a clothes clip carried by said closure extending rearwardly from said pivot.

19. In a fountain pen of the class described, a barrel, a nib carried by said barrel, a sleeve closed at one end and slidably carried by said barrel so as normally to enclose said nib and having a longitudinal segmental opening extending rearwardly from said closed end, part of said opening being in alignment with and adapted to permit egress of said nib, a pivot mounted on said sleeve adjacent the rearward end of said opening, a closure for said segmental opening pivotally supported by said pivot, a clothes clip carried by said closure extending rearwardly from said pivot, a portion of said sleeve rearward of said pivot being bent inwardly to form a longitudinal ridge and a protuberance on the inner side thereof and a conforming groove and recess on the outer side, said groove and said recess being adapted to receive said clip in flush alignment with said sleeve, a portion of said barrel within said sleeve having a longitudinal groove adapted to coact with said protuberance as a keyway therefor, a spring carried in said first-mentioned groove urging said clip outwardly from said sleeve, a nib guard supported by said barrel and having an upturned end adapted to make contact with said closure and to move said closure outwardly from said segmental opening when said barrel is moved forwardly relative to said sleeve, and a detent on the inner side of said closure adapted to engage the rearward side of said upturned end when the closure is closed.

20. In a fountain pen of the class described, a barrel, a nib carried by said barrel, a sleeve closed at one end and slidably carried by said barrel so as normally to enclose said nib and having a longitudinal segmental opening extending rearwardly from said closed end, part of said opening being in alignment with and adapted to permit egress of said nib, a pivot mounted on said sleeve adjacent the rearward end of said opening, a closure for said segmental opening pivotally supported by said pivot, a clothes clip carried by said closure extending rearwardly from said pivot, a portion of said sleeve rearward of said pivot being bent inwardly to form a longitudinal ridge on the inner side thereof and a conforming groove on the outer side, said groove being adapted to receive said clip in flush alignment with said sleeve, a conical point on said barrel adjacent said nib having an annular groove adapted to engage the end of said closure when the closure is open, a detent on the inner side of said closure adapted to engage said annular groove when the closure is closed and to coact with said conical point to open the closure when said barrel is moved forwardly relative to said sleeve, and a spring carried within said sleeve and bearing against said sleeve and said barrel so as to urge said barrel rearwardly relative to said sleeve.

JAMES A. MOORE.

REFERENCES CITED

The following references are of record in the file of this patent:

UNITED STATES PATENTS

| Number | Name | Date |
|---|---|---|
| 933,248 | Grant | Sept. 7, 1909 |
| 1,839,817 | Walker | Jan. 5, 1932 |
| 2,201,400 | Houston | May 21, 1940 |